Jan. 20, 1970  N. E. RISK  3,490,608
MOTOR ARRANGEMENT FOR REGULATING DISTRIBUTION
OF A LOAD SUPPORTED BY A VEHICULAR BOOM
Filed Sept. 3, 1968
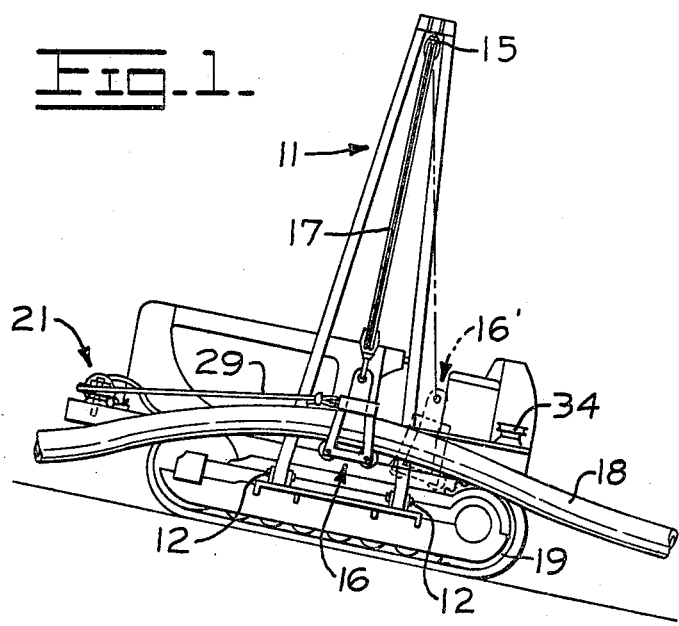
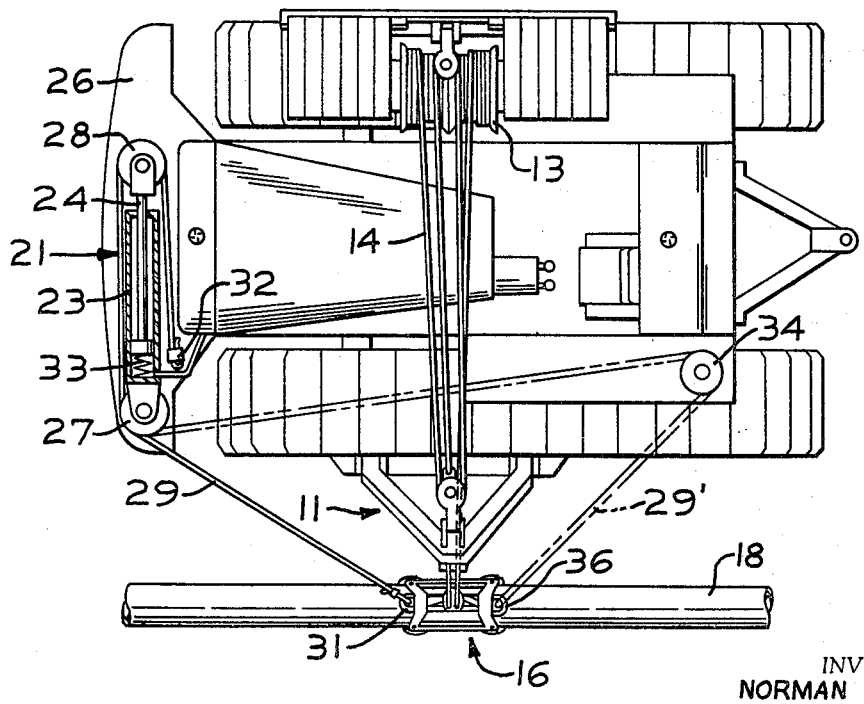
INVENTORS
NORMAN E. RISK
BY
ATTORNEYS ically and vertical boom disposed at one side of the vehicle and pivoted to the vehicle along an axis transverse to the vehicle, a material handling element for supporting a load, means for freely suspending the material handling element from the boom, motor means associated with the vehicle and means interconnecting the motor means with the material handling element for transversely shifting the element from a generally vertically suspended position beneath the boom to a position adjacent the center of gravity of the vehicle for improving distribution of weight supported by the element relative to the vehicle when the vehicle is on an inclined surface.

United States Patent Office 3,490,608
Patented Jan. 20, 1970

3,490,608
MOTOR ARRANGEMENT FOR REGULATING DISTRIBUTION OF A LOAD SUPPORTED BY A VEHICULAR BOOM
Norman E. Risk, Peoria, Ill., assignor to Caterpillar Tractor Co., Peoria, Ill., a corporation of California
Filed Sept. 3, 1968, Ser. No. 756,860
Int. Cl. B65g 7/08; B66c 23/54
U.S. Cl. 214—1                                    6 Claims

ABSTRACT OF THE DISCLOSURE

To distribute the load supported by a material handling element suspended from a vehicular boom, motor means are mounted on the vehicle and connected with the material handling element for shifting its suspended position beneath the boom and improving distribution of weight supported by the element relative to the vehicle when the vehicle is operating on an inclined surface.

---

The present invention provides means for regulating load distribution in a vehicle having a suspended material handling element. The invention is described below in combination with a pipe laying vehicle which particularly exemplifies the problem to be overcome by the invention.

Pipe laying vehicles are often required to support substantial loads while operating upon rough and very uneven terrain. Since the load is commonly suspended from an overhead boom, the supported load may tend to seriously affect the center of gravity for the vehicle while it is operating on an inclined surface so that the vehicle tends to become unstable. If the surface supporting the vehicle is sufficiently inclined, it may result in loss of control or even overturning of the vehicle.

The present invention provides particularly simple and effective means for redistributing the load in a vehicle having a suspended load and overcoming the problems referred to above. Other advantages and objects of the invention are made apparent in the following description having reference to the accompanying drawing.

In the drawing:

FIG. 1 is a side view in elevation of a vehicle for supporting a load by means of an overhead boom and including the arrangement of the present invention; and FIG. 2 is a plan view of the vehicle shown in FIG. 1.

The invention is described with exemplary reference to a track type, pipe laying vehicle as shown in FIGS. 1 and 2. The vehicle has an overhead boom 11 supported by pivotal amounts 12 arranged along one side of the vehicle. The boom is pivoted in a plane transverse to the vehicle by means of a winch 13 which is connected to the boom by suitable line or cable 14. A material handling element or sling 16 is suspended from the boom by flexible lines 17 for supporting a load such as the pipeline 18.

The problem to be overcome by the present invention arises when the vehicle is operating upon an inclined surface such as that illustrated in FIG. 1 where the forward end of the vehicle is substantially higher than its rearward end. Since the load carrying sling 16 is otherwise free to shift under the load it supports, the sling would tend to be situated in a position directly below its support point 15 on the boom 11, as illustrated by the broken line position of the sling at 16'. With the sling in this position, the load supported by the vehicle would tend to be concentrated adjacent its rear track sprockets, one of which is indicated at 19, and cause the unstable conditions referred to above.

To maintain the sling in a generally central position relative to the vehicle, as illustrated by its solid line location at 16, suitable motor means 21 are mounted on the vehicle and connected to the sling 16 by means of a line 29 for shifting the sling position by means of the motor 21. The motor 21 is illustrated as being a hydraulically operated cylinder. However, it could also be a winch operated from the tractor engine, for example. To simplify and minimize capital expense of the motor 21, it preferably includes a single acting hydraulic cylinder 23 having an extendible rod 24. The motor is preferably arranged transversely to the vehicle upon a bumper 26 at the forward end of the vehicle. The head end of the cylinder is on the same side of the vehicle as the boom 11 adjacent a first sheave 27 which is also mounted upon the bumper 26. Another sheave 28 is pivotally supported by the extendible end of the rod 24.

To regulate load distribution when the vehicle is operating on a forward incline as illustrated in FIG. 1, a flexible line 29 is secured at 31 to the sling 16. The line 29 is passed over the sheave 27, the extendible sheave 28 and is then secured to the vehicle at 32. By extending the rod 24 and sheave 28, the sling is shifted forwardly so that the load carried by the sling is directly above the preferred center of gravity for the machine. The cylinder 23 also includes a spring 33 which tends to extend the rod 24 and take up slack in the line 29 while the motor is not being employed to shift the sling 16.

It is also desirable to permit the motor 21 to shift the sling 16 under conditions where the vehicle is operating on a slope opposite that illustrated in FIG. 1. The motor 21 could be of the double acting type with its extendible portion being connected to the sling through suitable sheaves making it effective to shift the sling in either direction. However, the present invention contemplates use of the vehicle over extended periods of time on a slope inclined in a single direction. To permit use of the single acting motor 21 on a slope opposite that illustrated in FIG. 1, an additional sheave 34 is mounted at the opposite end of the vehicle. The flexible line 29 is arranged along a path illustrated at 29' in which it is connected to the sling at 36 and then passes over the sheave 34 before passing over the sheaves 27 and 28 in the same manner as described above. The single acting motor is accordingly employable to shift the sling in either direction merely by rearranging the flexible line 29.

What is claimed is:

1. A material handling vehicle comprising a generally rigid and vertical boom disposed at one side of the vehicle and pivoted to the vehicle along an axis transverse to the vehicle, a material handling element for supporting a load, means for freely suspending the material handling element from the boom, motor means associated with the vehicle and means interconnecting the motor means with the material handling element for transversely shifting the element from a generally vertically suspended position beneath the boom to a position adjacent the center of gravity of the vehicle for improving distribution of weight supported by the element relative to the vehicle when the vehicle is on an inclined surface.

2. The invention of claim 1 wherein the material handling element is a pipelaying sling.

3. The invention of claim 1 wherein the motor means is a hydraulic cylinder transversely mounted on one end of the vehicle, the suspension means being a flexible line.

4. The invention of claim 3 wherein the cylinder has a rod portion extendible away from the boom mounted side of the vehicle, first sheave means being secured adjacent the head end of the cylinder, second sheave means being mounted on the extendible rod, the interconnecting means being a flexible line with one end secured to the material handling element, trained over the first and second sheave means and secured at its opposite end to the vehicle.

5. The invention of claim 4 wherein the hydraulic cylinder is of the single acting type to permit shifting of the element in at least one direction and further comprising means for normally taking up slack in the flexible line.

6. The invention of claim 5 further comprising additional sheave means at the opposite end of the vehicle from the cylinder, for permitting training of the flexible line over the additional sheave between the element and the first said sheave to shift the material handling element in the opposite direction.

References Cited

UNITED STATES PATENTS

| 1,747,698 | 2/1930 | Clausen | 214—138 |
| 2,967,628 | 1/1961 | Erdahl et al. | |
| 3,058,600 | 10/1962 | Leake et al. | |
| 3,166,205 | 1/1965 | Symmank | 214—138 |

ROBERT G. SHERIDAN, Primary Examiner

F. E. WERNER, Assistant Examiner

U.S. Cl. X.R.

212—9